(12) United States Patent
Strogov et al.

(10) Patent No.: US 12,013,942 B2
(45) Date of Patent: Jun. 18, 2024

(54) ROOTKIT DETECTION BASED ON SYSTEM DUMP SEQUENCE ANALYSIS

(71) Applicant: Acronis International GmbH, Schaffhausen (CH)

(72) Inventors: Vladimir Strogov, Singapore (SG); Sergey Ulasen, Singapore (SG); Serguei Beloussov, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 134 days.

(21) Appl. No.: 17/656,971

(22) Filed: Mar. 29, 2022

(65) Prior Publication Data

US 2023/0315850 A1    Oct. 5, 2023

(51) Int. Cl.
   *G06F 21/56*    (2013.01)
   *G06F 21/00*    (2013.01)

(52) U.S. Cl.
   CPC .......... *G06F 21/566* (2013.01); *G06F 21/561* (2013.01); *G06F 2221/033* (2013.01)

(58) Field of Classification Search
   CPC ...... G06F 21/566; G06F 21/561; G06F 21/55; G06F 21/552; G06F 21/554; G06F 21/56; G06F 21/577; G06F 21/52
   See application file for complete search history.

(56) References Cited

U.S. PATENT DOCUMENTS

| | | | |
|---|---|---|---|
| 7,571,482 B2 | 8/2009 | Polyakov et al. | |
| 7,647,636 B2 | 1/2010 | Polyakov et al. | |
| 8,856,927 B1 | 10/2014 | Beloussov et al. | |
| 9,245,114 B2 | 1/2016 | Thomas et al. | |
| 9,400,886 B1 | 7/2016 | Beloussov et al. | |
| 10,417,420 B2 | 9/2019 | Zhang | |
| 2007/0162975 A1 | 7/2007 | Overton et al. | |
| 2015/0089655 A1 | 3/2015 | Choi et al. | |
| 2016/0224789 A1* | 8/2016 | Feroz | G06F 9/45558 |
| 2021/0216667 A1 | 7/2021 | Strogov et al. | |
| 2023/0214489 A1 | 7/2023 | Strogov et al. | |

FOREIGN PATENT DOCUMENTS

| | | |
|---|---|---|
| CN | 110618854 | 12/2019 |
| CN | 112560018 | 3/2021 |
| CN | 113010268 | 6/2021 |
| KR | 101824583 | 9/2017 |
| KR | 20190109203 | 9/2019 |

* cited by examiner

*Primary Examiner* — Edward Zee
(74) *Attorney, Agent, or Firm* — ESPE Legal Consultancy FZ-LLC

(57) ABSTRACT

The present disclosure relates to a system and method for rootkit detection based on a system dump sequence analysis. The system includes a security system in communication with one or more applications of a computing system. The security system includes a system event monitor to monitor events occurring at the applications, a system dump capture driver to capture differential system dumps corresponding to each event, and a rootkit detection engine to determine if a system state is infected. The rootkit detection engine is based on a machine learning model, where the machine learning model is trained on collection of clean system dumps and infectious system dumps. Based on analysis carried out by the machine learning model, the rootkit detection engine can classify the system state as suspicious, infectious, or clean state.

19 Claims, 8 Drawing Sheets

ROOTKIT DETECTION BASED ON SYSTEM DUMP SEQUENCE ANALYSIS

FIELD OF THE INVENTION

The present disclosure generally relates to computer security systems. In particular the present disclosure relates to a rootkit detection system based on a system dump sequence implemented for identifying the rootkit infection present in a computing system.

BACKGROUND OF THE INVENTION

Threat posed by malicious software, also known as malware, harms the computer systems to a great extent. Malware may come in many forms and behaviors that present a serious risk to millions of computer users, making them vulnerable to loss of data, identity theft, and loss of productivity, among others. To prevent malware attacks, many malware detection systems have been developed and implemented worldwide. Many forms of the malware can be detected even before infecting the computer system, and can be removed, thus protecting the computer systems from the malware attack. One of the most difficult malwares to detect is a rootkit.

The rootkit is malicious software used to install and hide other malicious programs inside a computer system. Standard anti-virus or anti-spyware often fail to detect the rootkits as the rootkits are programmed such that those are very difficult to detect through standard scans. The rootkits can be categorized as one of the following five types depending upon the location in the computing system in which the rootkit executes: (1) firmware, (2) hypervisor, (3) kernel, (4) library, and (5) application.

Particularly, the rootkits operating at the kernel level allows the rootkit to disguise itself as a trusted process and hide the rest of the attack's rudiments, such as files, processes and memory areas. In one example, a kernel-level rootkit adds additional code or replaces portions of an operating system, including both the kernel and associated device drivers. Most operating systems consider the kernel-mode device drivers and the operating system itself at the same level and execute the kernel-mode device drivers with the same privileges as the operating system itself. Therefore, many kernel-level rootkits are developed as device drivers or loadable kernel models.

As a person skilled in the art can comprehend that the code added or replaced, at the operating system, by a kernel-level rootkit may have serious implications on the security of the computing system, specially, the degree of impact may directly correspond to type of bug present in the code. The kernel-level rootkits are more threatening as compared to other malware as the kernel-level rootkits operate at the same security level as the operating system itself. The kernel-level rootkits, thus, are able to intercept or subvert operations performed by the operating system, including operations of anti-virus software running on the compromised system.

It is difficult to detect the rootkit during the injection process, but it is crucial to identify the rootkit during its execution. It is strenuous to prevent rootkit infections because it is almost impossible to track the path of infection of the system at the moment when active rootkit infections are denied. Number of rootkit detection and prevention techniques degrade system performance, and also have limited detection and prevention capabilities because such techniques operate only at later stages of the booting of the operating system.

Currently, there are a number of known techniques to detect the rootkit. Some rootkit detecting and preventing tools have oftentimes utilized heuristic (e.g., cross view based, integrity checkers, etc.) detection techniques for detecting rootkits. However, such heuristic detection techniques have been associated with various limitations. For example, conventional techniques have detected rootkits by detecting suspicious behavior, thus inhibiting any ability to classify the rootkits in a manner so as to provide precise detection and cleaning capabilities, along with an inability to provide details of a particular family of rootkits.

Further, some rootkit detecting and preventing tools may utilize signature-based techniques for detecting rootkits. However, such signature-based techniques have also generally exhibited various limitations. For example, in the signature-based techniques, it is difficult to identify specific areas of memory for scanning for rootkits, thus resulting in a costly and inefficient manner of performing rootkit detection in addition to an inability to provide precise cleaning capabilities.

As an alternative to heuristic and signature-based techniques, few rootkits detecting and preventing techniques are based upon determining the modification of the computing system memory and analyzing a memory dump. For example, the rootkit detecting and preventing tool is configured to obtain and analyze the memory dump of the data maintained by the operating system on a target computer. In this instance, the kernel debugging facilities extract relevant information from the memory dump that is analyzed either on the computing system or a virtual machine to determine the extent to which a network of computers has been infected with the rootkit. However, in this technique, unordered collection and analysis of dumps may require a large amount of memory storage for capturing and storing system dumps, and it may become more difficult to classify the system dumps with the required accuracy.

Therefore, it is necessary to collect the only system dumps that characterize a certain state of the computing system during the execution of programs and analyze changes in the system by means of processing a sequence of dumps or their differentials. Thus, there exists a need to overcome at least one of the preceding deficiencies and limitations of the related art.

SUMMARY OF THE INVENTION

The present disclosure generally relates to a computer security system. In particular the present disclosure relates to a threat detection system based on a system dump sequence analysis implemented for identifying the threat infection present in a computing system.

The invention comprises systems and methods for classifying a system state and detecting threats on a target computing system. In an embodiment, a method is executed on a processor associated with the target computing system The security system, implemented on a computing system, to identify a threat during the execution of the malicious function is based upon a system dump sequence analysis. The security system comprises of a system event monitor for intercepting and collecting one or more application activity events, a system dump capture driver configured to capture memory dump and generate a differential memory dump in accordance with intercepted application activity events, a rootkit detection engine for classifying system state as infected, suspicious or clean based on system dump sequence and system event sequence and machine learning model for clustering and storing system state classes definitions.

In an embodiment, the system event monitor is configured to intercept and collect one or more application activity events of the computing system. Monitoring priority is allotted to the malicious applications or to the applications exhibiting malicious behavior. System event monitor intercepts and collects one or more application activity events in accordance with predefined security policy instilled within the security system.

In an embodiment, the system dump capture driver captures the first memory dump and the second memory dump in response to the one or more application activity events in accordance with predefined security policy. In an implementation the first memory dump corresponds to memory before application activity corresponding to intercepted application activity events, and the second memory dump corresponds to memory after application activity corresponding to intercepted application activity events. The memory dump is a process of capturing all or a part of information content in RAM and storing it in a storage device. The information content can be accessed later, particularly, in case of application or system crash. The system dump capture driver captures one or more memory dumps corresponding to the application activity events being monitored by the system event monitor.

In an embodiment, the rootkit detection engine is configured to detect the threat. The rootkit detection unit, in one implementation, is configured to receive the system dump sequence as a first data input, and a system event sequence from the system event monitor as a second data input. In one implementation, the system dump sequence consists of at least two differential memory dumps generated by the system dump capture driver and the system event sequence consists of intercepted application activity events corresponding to differential memory dumps in the system dump sequence. The rootkit detection unit, in one implementation, is further configured to classify a system state by executing a machine learning model based on the first input data and the second input data, into at least three classes, wherein three classes are an infected system state, a suspicious system state and a clean system state.

In an alternative embodiment, the rootkit detection engine is configured to classify a system state based on updated first data input and updated second data input. The updated first data input comprises additional differential memory dump and updated second data input comprises additional system events corresponding to additional differential memory dump. To optimize the operation cost the rootkit detection engine processes updated data inputs only if the system state is classified as suspicious.

In an alternative embodiment, the one or more application event includes one or more system drivers file operations, one or more process interconnections, one or more buffer operations, one or more network communication related to running applications, one or more Application Programming Interface calls, and one or more system driver requests.

In an alternative embodiment, the system event monitor is configured to monitor the events that are indicators of attack and present in at least one threat behavior definitions or signatures.

In an alternative embodiment, the system dump sequence is generated by the system event monitor to determine the relationship between the detected rootkit infection and an operation process that initiated the rootkit infection.

In an alternative embodiment, the machine learning model trains on a system dump sequence and system event sequence corresponding to the uninfected system.

In an alternative embodiment, the machine learning model trains on a system dump sequence and system event sequence corresponding to the system infected by known malware.

In an alternative embodiment, the machine learning model is based on an artificial neural network.

In an alternative embodiment, the security system is running in user mode, in kernel mode or in user and kernel modes.

In an alternative embodiment, the security system can be implemented on a virtual machine.

In an alternative embodiment, a rootkit detection alert is generated upon rootkit detection.

It should be noted that the system described above is operated by one or more method steps implemented in and executed by the system comprising a hardware processor. Alternatively, the method steps may be implemented using computer executable instructions of a non-transitory computer readable medium.

DETAILED DESCRIPTION

The embodiments will now be described more fully hereinafter with reference to the accompanying figures, in which preferred embodiments are shown.

To provide an overall understanding of the systems and methods described herein, certain illustrative embodiments will now be described, including systems and methods for storing trusted data at a cloud storage service. A server or system as used in this description may be a single computing device or multiple computing devices working collectively and in which the storage of data and the execution of functions are spread out amongst the various computing devices.

A virtual machine refers generally to an isolated computing environment operated on a host, referred to as a computing system. Several virtual machines can run on a single host on top of the hypervisor level. System dumps and snapshots or backup copies of virtual machines are captured faster than a standalone computing system due to the existing memory and storage controlling system of the hypervisor. Virtual machines are protected with a security-system system dump or memory dump. Backup copies are captured using system services of the hypervisor. Computer programs described in some embodiments of the present invention are stand-alone software entities or sub-entities (e.g., subroutines, code objects) of other computer programs. A target object is generally a file or a process residing on a client computer system. Computer readable media encompass non-transitory media such as magnetic, optic, and semiconductor storage media (e.g., hard drives, optical disks, flash memory, DRAM), as well as communications links such as conductive cables and fiber optic links. According to some embodiments, the present invention provides computer systems comprising hardware with one or more processors programmed to perform the disclosed methods, as well as computer-readable media encoding instructions to perform these methods.

Figure 1:
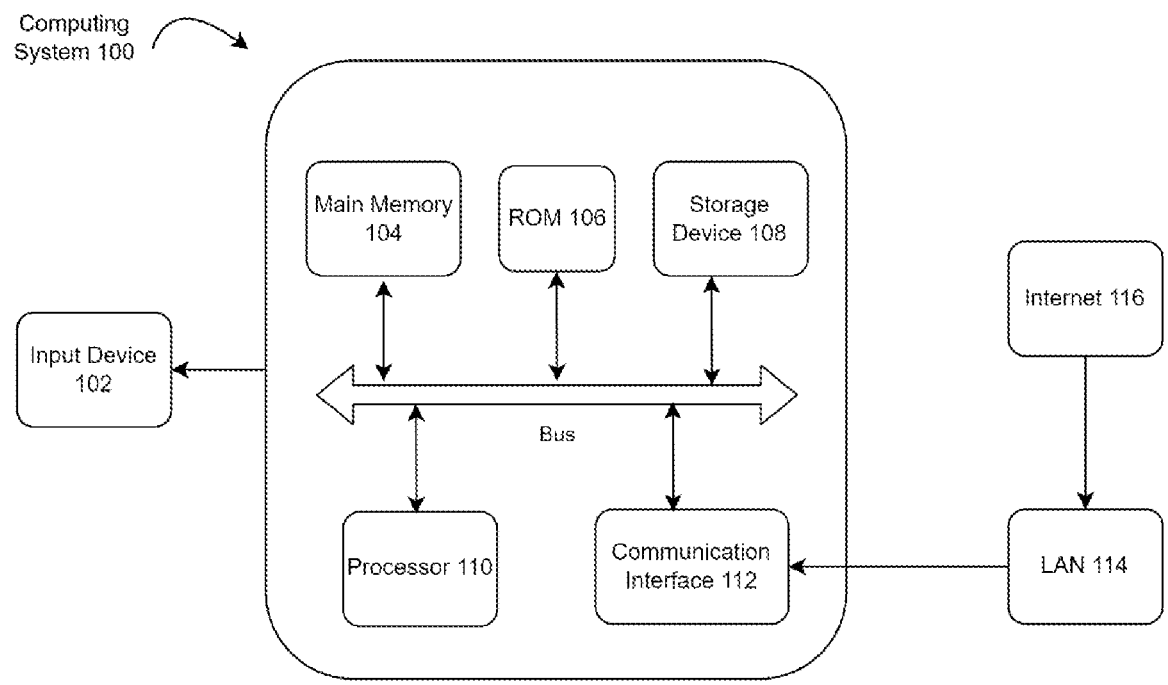
FIG. 1 shows a block diagram that illustrates an environment for a system implementation, in accordance with an embodiment.

Aspects of the system and methods described provide a system to detect rootkit infection, during execution of the system process, based on a system dump sequence analysis. In general, rootkit is regarded as one the most difficult malware to detect. It is impossible to detect rootkit infection during the injection process. Therefore, it is necessary to identify the threat during its execution. The present disclosure collects one or more memory dumps and analyzes the memory dump in conjunction with a system dump sequence and application events. A machine learning model, which is trained on the collection of clean files and known threats, is configured to differentiate between a clean memory dump and an infected memory dump. Based on the differentiation, the system can determine whether the system is infected or not. FIG. 1 shows a block diagram that illustrates an environment for a system implementation. The system includes a computing system connected to the Internet. Such configuration is typically used for computers (hosts) connected to the Internet and executing a server or a client (or a combination) software.

The computing system may include a bus, an interconnect, or other communication mechanism for communicating information, and a processor 110, commonly in the form of an integrated circuit, coupled to the bus for processing information and for executing the computer executable instructions. The computing system may also include a main memory 104, such as a Random Access Memory (RAM) or other dynamic storage device, coupled to the bus for storing information and instructions to be executed by the processor 110. The main memory also may be used for storing temporary variables or other intermediate information during execution of instructions to be executed by the processor 110. The computing system may further include a Read Only Memory (ROM) 106 (or other non-volatile memory) or other static storage device coupled to the bus for storing static information and instructions for the processor 110. Storage device 108, comprises a magnetic disk or optical disk, such as a hard disk drive (HDD) for reading from and writing to a hard disk, a magnetic disk drive for reading from and writing to a magnetic disk, or an optical disk drive (such as DVD) for reading from and writing to a removable optical disk. Storage device 108 is coupled to the bus for storing information and instructions. The hard disk drive, magnetic disk drive, and optical disk drive is connected to the system bus by a hard disk drive interface, a magnetic disk drive interface, and an optical disk drive interface, respectively. The drives and their associated computer-readable media provide non-volatile storage of computer readable instructions, data structures, program models and other data for the general-purpose computing devices.

Typically, the computing system includes an Operating System (OS) stored in a non-volatile storage for managing the computer resources and provides the applications and programs with an access to the computer resources and interfaces. An operating system commonly processes system data and user input and responds by allocating and managing tasks and internal system resources, such as controlling and allocating memory, prioritizing system requests, controlling input and output devices, facilitating networking and managing files.

Processor 110 refers generally to an integrated circuit or any other electronic device (or collection of electronic devices) capable of performing an operation on at least one instruction, including, without limitation, a microprocessor (µP), a microcontroller (µC), a Digital Signal Processor (DSP), or any combination thereof. A processor 110 may further be a Reduced Instruction Set Core (RISC) processor, a Complex Instruction Set Computing (CISC) microprocessor, a Microcontroller Unit (MCU), or a CISC-based Central Processing Unit (CPU).

A memory can store computer programs or any other sequence of computer readable instructions, or data such as files, text, numbers, audio and video, as well as any other form of information represented as a string or structure of bits or bytes. The physical means of storing information may be electrostatic, ferroelectric, magnetic, acoustic, optical, chemical, electronic, electrical, or mechanical. A memory may be in the form of an Integrated Circuit (IC, a.k.a. chip or microchip). Alternatively, or in addition, a memory may be in the form of a packaged functional assembly of electronic components (model). Such model may be based on a Printed Circuit Board (PCB) such as PC Card according to Personal Computer Memory Card International Association (PCMCIA) PCMCIA 2.0 standard, or a Single In-line Memory Model (SIMM) or a Dual In-line Memory Model (DIMM), standardized under the JEDEC JESD-21C standard. Further, a memory may be in the form of a separately rigidly enclosed box such as an external Hard-Disk Drive (HDD).

The computing system commonly includes a communication interface 112 coupled to the bus. The communication interface 112 provides a two-way data communication coupling to a network link that is connected to a Local Area Network (LAN). For example, the communication interface may be an Integrated Services Digital Network (ISDN) card or a modem to provide a data communication connection to a corresponding type of telephone line.

Figure 2:
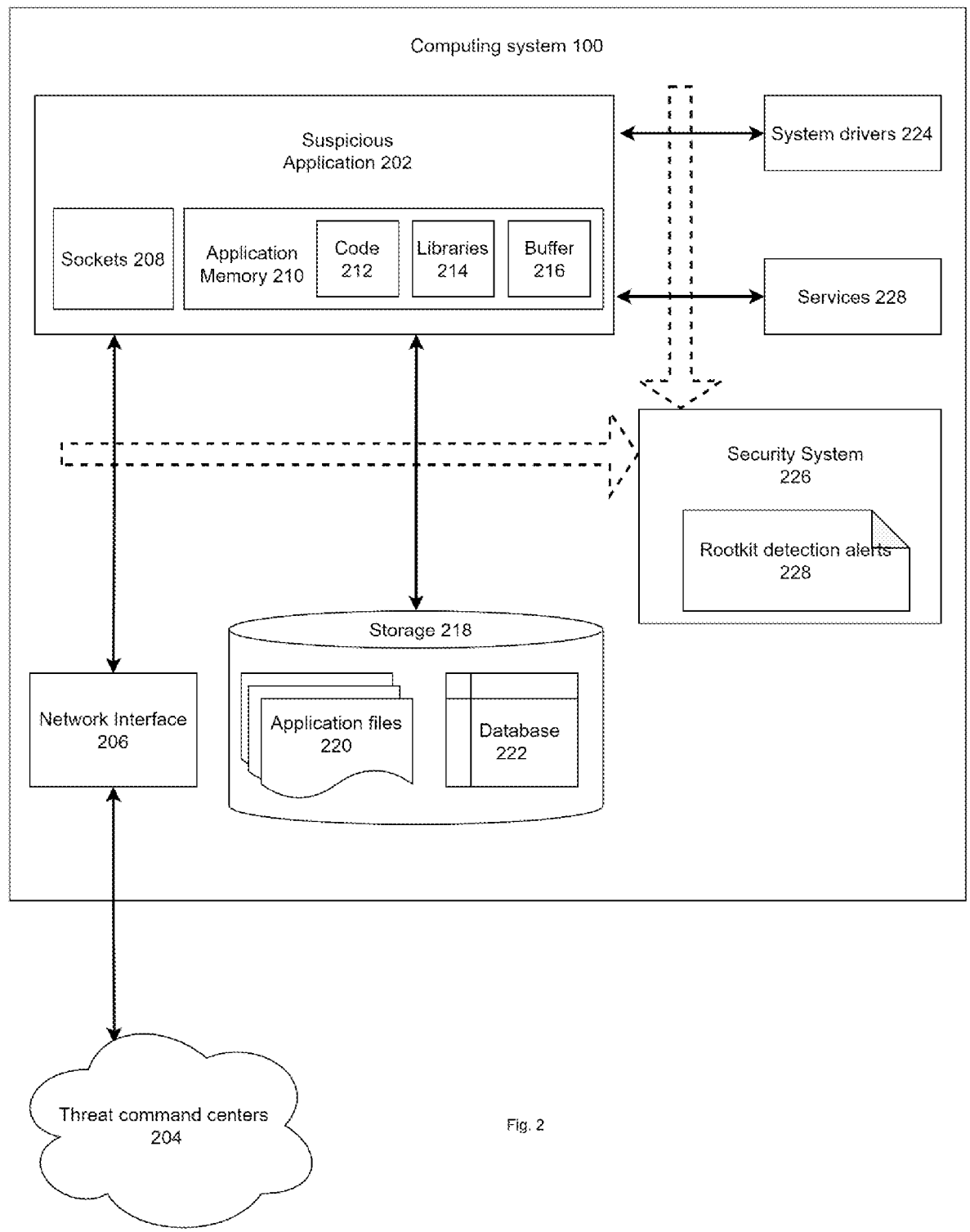
FIG. 2 describes a functional block diagram of the computing system having a rootkit detection system implemented on it.

FIG. 2 describes a functional block diagram of computing system 100 having a security system 226 implemented on it. In one implementation, security system 226 is implemented on a virtual machine. Computing system 100 may include one or more system applications. Application 202 may get into communication with a threat command center 204 through one or more network interfaces 206. Threat command center 204 is a remote computer that controls the operation of malicious application 202 by sending commands, downloading user or system data, running scripts or uploading patches or software code. Threat command center 204 can communicate with application 202 using common protocols like ftp, Ftps, http or https to complicate the detection of malicious activity. Such malware may infect at least one application 202 and cause malfunctioning. Such applications are referred to as infected applications, or if the cause of the malfunction is not determined, application 202 is treated as a suspicious application 202 and analyzed further.

Application 202 is designed and configured to manage the resources of the system, such as memory and process management, security, and the like. The applications are specifically configured to implement and execute the user's requirement for performing a specific task. Application code 212 may be written in a low-level language like a machine or assembly language. Computing system 100 implements one or more types of applications. The applications can be broadly categorized into different types. Examples of the broad classification of general application may include, but may not be limited to, Web browsers, Presentation software, Spreadsheet software, Graphic software, Word processors, Database software, Multimedia software, Education software, Information software, and Content access software.

According to an embodiment, application 202 may include a socket 208 and an application memory 210. Socket 208 is a software entity that provides basic building blocks for inter-process communications, and functions as an endpoint of communication between application processes. Socket 208 uniquely identifies a connection between two communicating sides by an identifier including a network address and a network port, wherein the network address refers to address of an entity creating socket 208, e.g., an application process, and the network port refers to a communications port of this entity as known to other entities in the network. Sockets may generally be created by the underlying operating system (not shown) in the context of which application is running. Once a socket 208 is created, the application process may connect with another socket 208 associated with another application process, and thus establish a network connection with the other application process. Once the socket 208 connection has been established between two applications or two application processes, messages and data can be sent between the applications or processes using a selected network transmission protocol. In other words, a socket 208 is a component of an application program interface (API) that allows applications running on data processing systems in a network to communicate with each other. It identifies a communication endpoint in a network and can be connected to other socket 208s in the network. An application 202 or process may place data in a first socket that it has created and send the data to another socket connected to the first socket, thereby transmitting data to another application or process that has established the second socket. These sockets 208 hide the protocol of the next lower layer in the underlying network architecture from the processes when performing the communication between the processes.

As described, socket 208 is configured for establishing communication with other application processes. According to the same embodiment, application memory 210 is implemented and compartmentalized to provide one or more memory sections for storing code 212, libraries 214, and buffer 216. In one implementation, application memory 210 can be magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Application memory 210, in accordance with the embodiment, may store code 212. Typically, codes, which may be referred to as an application program, are constructed by combining segments of program code 212 obtained from different sources. Library 214 stores predefined instructions required for execution of functions associated with the application. For example, library 214 may include instructions for data exchange with client devices using one or more sockets 208 along with enabling data exchange with HTTP proxy using multiple pointers.

Buffer 216 is a memory space in the application memory 210 dedicated to store the packet of data transferred from application 202 to system driver 224 or service 228.

According to the embodiment, the application 202 may get in communication with threat command center 204 via network interface 206. Computing system 100 may include one or more network interfaces 206 or network adapters for communicating with the remote computers via one or more networks, such as a local-area computer network (LAN), a wide-area computer network (WAN), an intranet, and the Internet. Examples of the network interface may include an Ethernet interface, a Frame Relay interface, SONET interface, and wireless interfaces.

According to the embodiment, the storage is provided to store one or more application files 220 and to provide database 222 for the application.

According to the embodiment, each of the one or more applications is connected to system drivers 224, referred to as a device driver interchangeably. The device driver provides a programmable software interface to hardware devices, enabling operating systems and the one or more applications to access hardware functions without needing to know precise details about the hardware being used.

In one implementation, the device driver may communicate with the computer hardware by computer subsystem or computer bus connected to the hardware. In another implementation, device drivers 224 may communicate with one or more peripheral devices connected to computing system 100 externally. According to the embodiment, various types of device drivers 224 are implemented. Examples of the type of drivers 224 may include, but not limited to, kernel-mode device driver, user-mode device driver, and virtual device driver.

The one or more applications, in accordance with the embodiment, are in communication with one or more system services. Examples of the services include program execution, I/O operations, file system manipulation, communication, error detection resource allocation, and protection.

The application, as described with reference to FIG. 2, is connected with device drivers 224, the one or more services, and the storage device. In case, if application 202 is attacked by any kind of threat from threat command center 204 via network interface 206, application 202 may get infected and may start malfunctioning. Computing system 100 may implement a security system 226 to monitor, detect and prevent malicious attacks. Security system 226 may detect malicious behavior of a suspicious application 202 and analyze one or more aspects of the application related to the malfunctioning/threat to determine the malware. In one particular embodiment, security system 226 is trained to determine the rootkit. Upon detection of the rootkit, a rootkit detection alert 228 is sent to computing system 100. Security system 226 is described with reference to FIG. 3.

Figure 3:
FIG. 3 illustrates functional blocks describing the security system.

FIG. 3 illustrates functional blocks describing the security system, in accordance with one embodiment. Security system 226 mainly includes, but may not be limited to, a system event monitor, a system dump capture driver, and a rootkit detection engine 306. Security system 226 is configured to monitor the one or more applications running on computing system 100 and determine if any process of application 202 has been attacked by the rootkit. Such applications are denoted as suspicious applications.

According to the embodiment, system event monitor 302 issued in either real-time, on demand, or on a schedule, to receive attributes related to the one or more events and an application activity log 308 containing a list of activities performed by the one or more applications. Examples of the event include login into some particular application, capturing data using a capturing application, accessing a web-link, and the like. In an aspect, considering external peripheral devices connected to computing system 100, the event is an access door unlocking or locking, capturing data using CCTV cameras, accessing and controlling network devices or storage devices connected to computing system 100. The events are sent in any number of formats to application activity log 308 unit. Application activity log 308, in one implementation, is configured to create a log of system events.

System event monitor 302, according to an embodiment, is configured to receive event related information from an application activity log 308. System event monitor 302 can integrate with the operating system to monitor various log entries, such as authentication events. System event monitor 302 is communicatively coupled to system dump capture driver 304 and rootkit detection engine 306.

According to the embodiment, the system capture driver is configured to generate one or more memory dumps. A memory dump involves capturing all or a part of the information stored in the random-access memory (RAM) and writing it to a storage drive. The memory dumps are typically used to gather diagnostic information subsequent to a crash for troubleshooting purposes. Using the built-in kernel functions of the operating system, the systems and methods described herein involve producing at least two memory dumps referred to as first memory dump which may be raw dumps associated with a system state or memory state prior to application activity execution, and a second memory dump which may be system dumps associated with a system state or memory state after application activity execution. First and second system dump differentiation contain the information defining changes performed in the system by corresponding application activity. The information captured by the memory dump may include code 212 image of the malicious content suspect, content of a memory region that has been allocated by the malicious content suspect (e.g., heaps, threads, context), data accessed by the malicious content suspect, embedded content extracted or downloaded during the execution, such as a file or another executable binary, as well as information identifying certain activities performed by the malicious content suspect. The memory dump is then analyzed to determine whether the malicious content suspect is indeed malicious by rootkit detection engine 306. The memory dump may be stored in rootkit detection engine 306 and analyzed subsequently for malicious content detection. The system capture driver may further be configured to create a system dump sequence. The system dump sequence is a sequence of system dumps or differential system dumps corresponding to a captured or collected list of application activity events.

Rootkit detection engine 306, according to the embodiment, is configured to receive one or more system dumps and a system dump sequence from the system capture driver to analyze, and subsequently, determine whether application 202 has been infected by the rootkit or not. Rootkit detection engine 306 is described in more detail with reference to FIG. 4.

Figure 4:
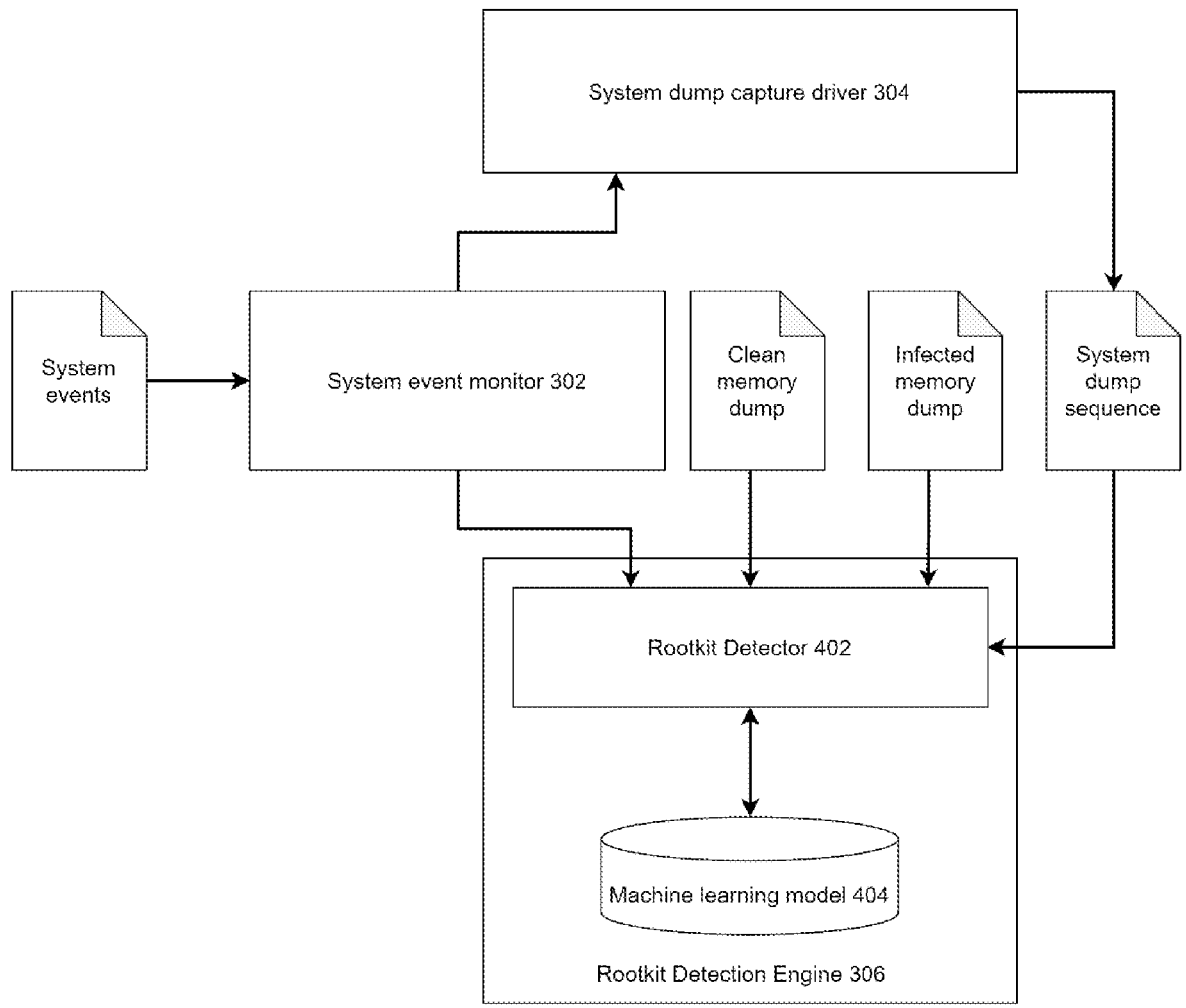
FIG. 4 describes functional components of the security system, in accordance with an embodiment.

FIG. 4 describes functional components of the security system, in accordance with an embodiment. As described earlier with reference to FIG. 3, system event monitor 302 captures attributes and information related to one or more system events. The captured data is provided to system dump capture driver 304 to produce system dump sequence. First memory dump, second memory dump, and the system dump sequence are received by the rootkit detection unit that is a functional part of rootkit detection engine 306. Further, the data related to one or more application activity events are received by the rootkit detection unit from the system event monitor.

According to one embodiment, rootkit detection engine 306 is configured to detect the rootkit threat and may include a rootkit detector 402. Rootkit detector 402 is communicatively coupled to a machine learning model 404 for rootkit detection.

Rootkit detector 402, in one implementation, is configured to collect the one or more application activity events from system event monitor 302, and the first memory dump, the second memory dump and the system dump sequence from system dump capture driver 304. The first memory dump may correspond to a clean memory dump, which is a memory dump of a process which has not been infected. The second memory dump may correspond to an infected memory dump, which is a memory dump of a process which has been infected by rootkit.

In an implementation, rootkit detector 402 is configured to compare respective vectors of the first memory dump and the second memory dump to generate a differential memory dump in conjunction with the one or more application system events. The differential memory dump is indicative of the difference between the first memory dump and the second memory dump. According to the embodiment, rootkit detector 402 is based and trained on machine learning model 404.

Machine learning models 404, in one implementation, can be based on the Siamese neural network. The Siamese neural network is a type of artificial neural network that consists of two identical neural subnets with the same set of weights. This type of network allows a user to compare the vectors of features of two objects in order to highlight their semantic similarity or difference. Siamese neural network is a non-linear display of data with the aim of bringing similar objects closer to each other and spreading different objects as far as possible. This type of machine learning model 404 allows a user to compare data of different types and determine their relationship. In one implementation, a triplet network is implemented. The triplet network compares clean and infected dumps with system requests or buffers in I/O operation and can produce a model that can determine the significant features of the system or memory dump and application activity events that identifies threats with less false positives.

The machine learning model 404, in other embodiment, may include a set of supervised learning algorithms, such as Boosted Decision Trees, Support Vector Machines, and Gaussian Mixture Models. Machine learning models 404s are specified in a predefined configuration or by a user. Machine learning model 404 receives the extracted features as inputs and produces scores as outputs for each input. The scores are produced using the provided feature vector as input to the specified model and model configuration, such as a Support Vector Machine with a trained SVM model. A statistical confidence is associated with detection events for indicating the effectiveness of potential remediation policy or actions. In one embodiment of this invention, the training process includes generation of statistics associated with the accuracy and performance of Machine learning model 404 wherein the statistics include the statistical means of the predicted output scores for positive and negative samples. For example, the statistics include a network traffic training score based on similarity to malicious behavior by software executing on a network-connected host system, a second network traffic training score based on similarity to benign behavior by software executing on a network-connected host system, and a network traffic training score based on similarity to malicious behavior associated with specific classes of malware. The statistics also include statistical standard deviations of the predicted output scores for positive and negative samples.

According to an embodiment, machine learning model 404 is configured to process the system dump sequence or captured system dumps or the system dump sequence of generated differential memory dumps as a first data input and system event sequence of application activity events corresponding to system dump sequence as a second data input. Machine learning model 404 analyzes all data in view of different machine learning algorithms. In an implementation, the machine learning model 404 is configured to compare the first data input and the second data input. In another implementation the machine learning model 404 is configured to process features of first and second data inputs in a consistent manner, combining features of system dump sequence with corresponding system event sequence to classify the system state characterized by a consistent feature set. The machine learning model 404 is further configured to classify a system state, based on the comparison of features determined from the first and second data inputs in accordance with the machine learning model, into at least three clusters. According to one implementation, at least three clusters are an infected system state, a suspicious system state and a clean system state. The infected system state may indicate the system has been infected. The suspicious system state may indicate that the system might have been infected and may have been analyzed further for threat detection. The clean system state may indicate that the system has not been infected by the rootkit.

Figure 5:
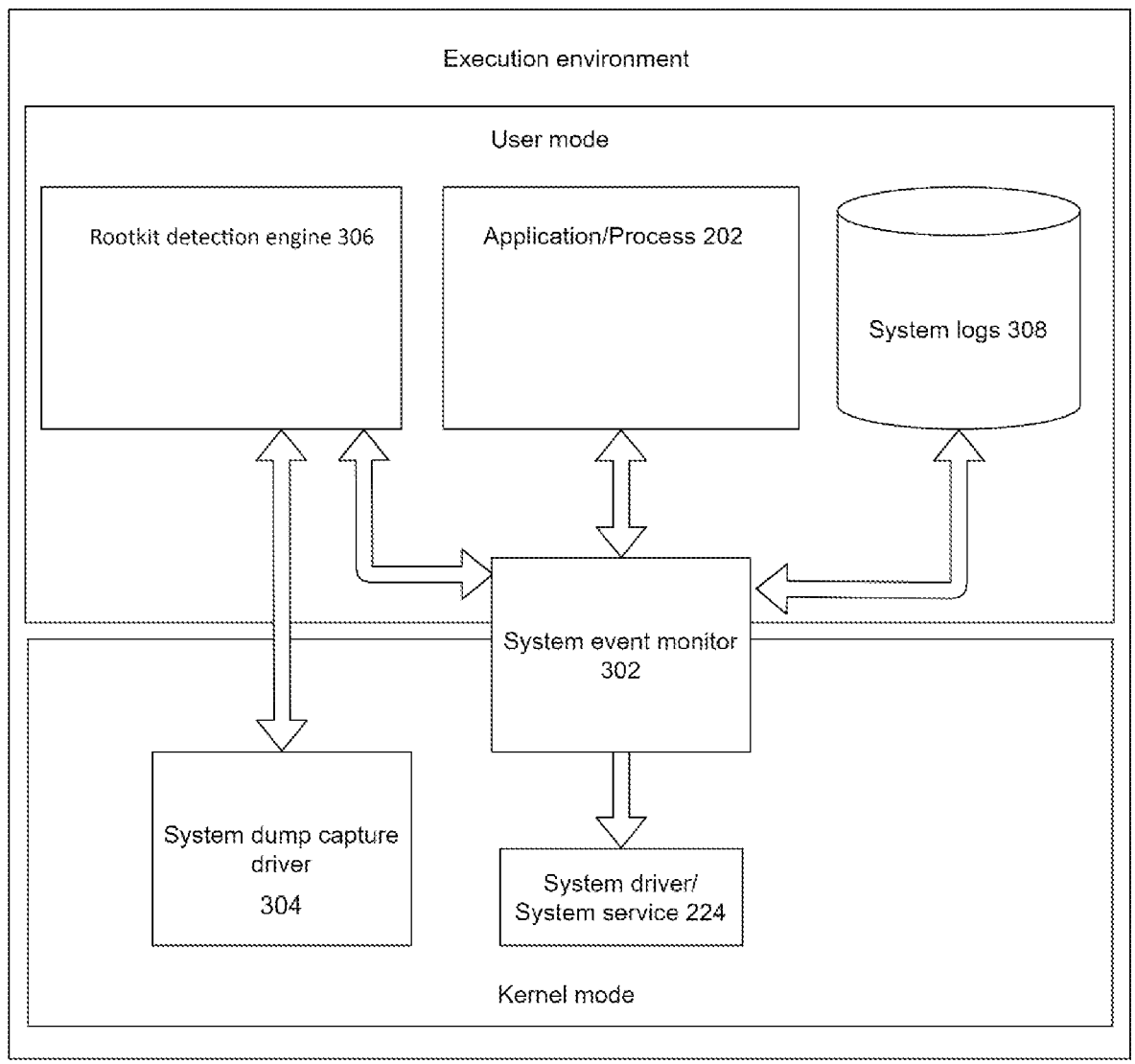
FIG. 5 describes an executive environment, in accordance with an embodiment.

FIG. 5 describes an executive environment, where the computing system 100 can be implemented, according to one embodiment. The computing system 100 is implemented in a user mode and a kernel mode. In the user mode, the rootkit detection engine 306, application execution and operations, and system log generation may function. At kernel mode, the system dump capture driver 304 and the system service is operated. The system event monitor 302 may function at both, the user mode and the kernel mode.

Figure 6:
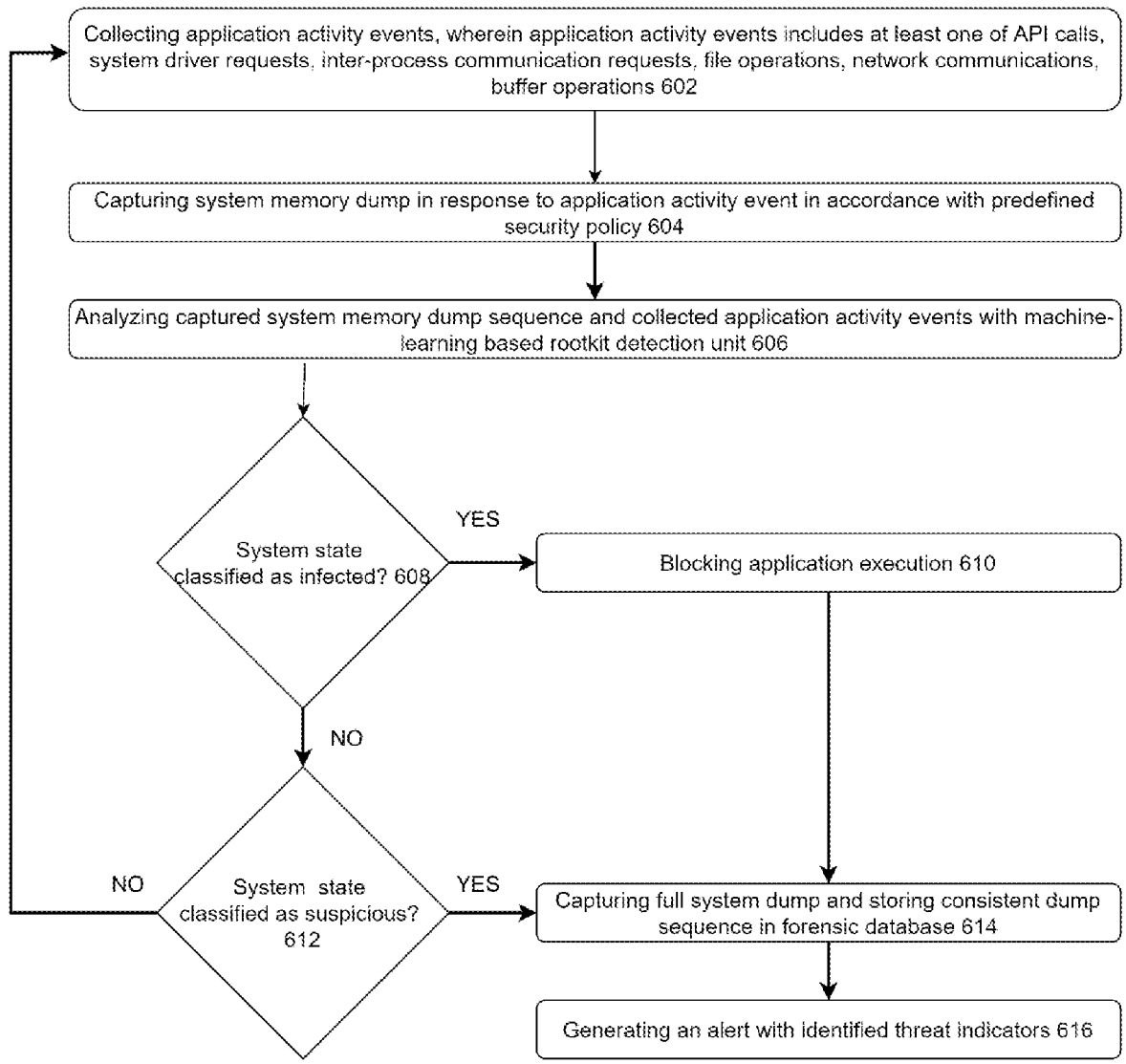
FIG. 6 describes a method block diagram for rootkit detection, in accordance with an embodiment.

FIG. 6 describes a method block diagram for rootkit detection, in accordance with the embodiment. At block 602, application activity events are collected by a system event monitor. The application activity events include at least one of API calls, system driver requests, inter-process communication requests, file operations, network communications, buffer operations. At block 604, the system dump capture driver 304 captures system memory dump sequence in response to application activity event in accordance with predefined security policy. At block 606, captured system memory dump sequence and collected application activity events are analyzed by the rootkit detection engine 306. At block 608, it is determined, based on the analysis of the rootkit detection engine 306, if the system is infected or not. If the rootkit is detected and the system state is classified as infected, the application execution is blocked at block 610. If the system state is not classified as infected, it will be determined whether the system state is suspicious at block 612. If the system state is classified as suspicious, a full system dump will be captured and a consistent dump sequence will be stored in forensic database 222, at block 614. If the analysis of full system dump results in detection of rootkit, a rootkit detection alert 228 with identified threat indicators will be generated, at block 616. At block 612, if the system state is classified as not suspicious the method flow will return to block 602 and the method steps for rootkit detection will be repeated.

Figure 7:
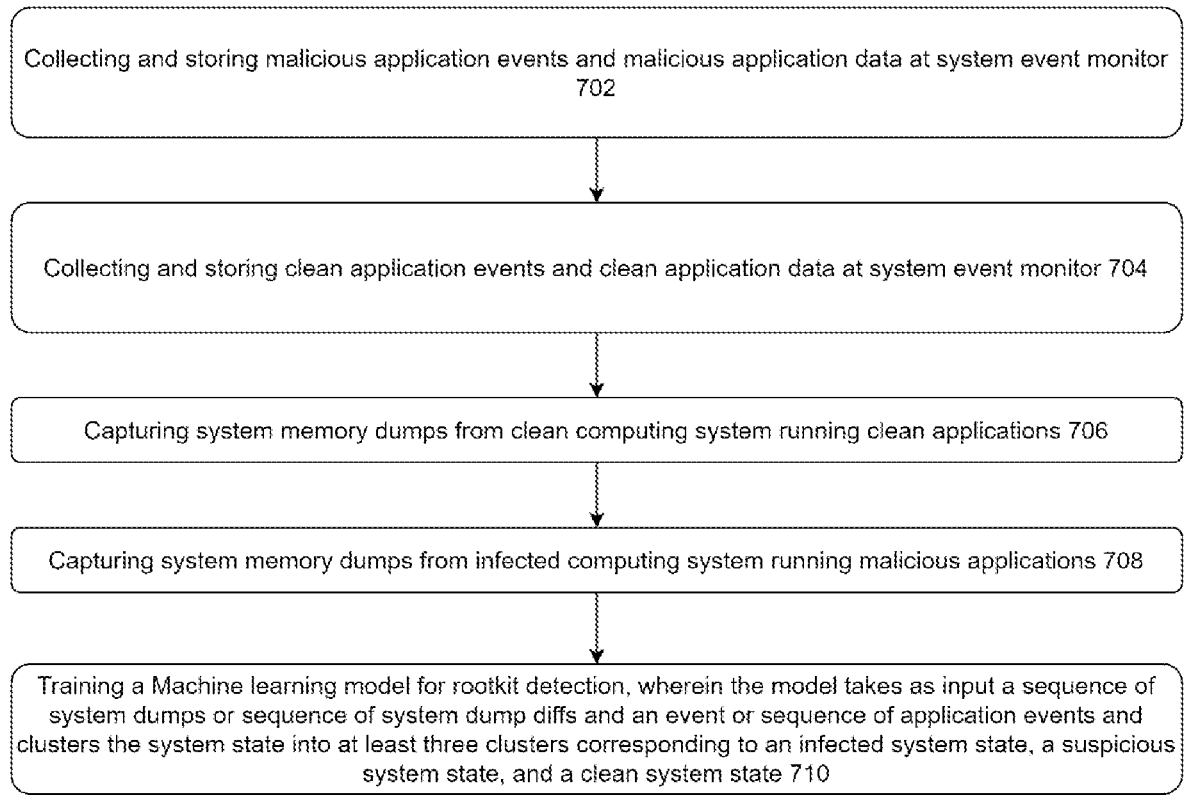
FIG. 7 describes method steps for capturing memory dumps and training a machine learning model for rootkit detection, in accordance with the embodiment.

FIG. 7 describes method steps for capturing memory dumps and training a machine learning model 404 for rootkit detection, according to an embodiment. At block 702, malicious application events and malicious application data is collected and stored at the system event monitor. At block 704, clean application events and clean application data is collected and stored at the system event monitor. At block 706, system memory dumps, referred to as first memory dumps, are captured from clean computing system 100 running clean applications. At block 708, system memory dumps, referred to as first memory dumps, are captured from infected computing system 100 running malicious applications. At block 710, a machine learning model 404 is trained for rootkit detection. Data captured at blocks 702 to 710 is fed to the machine learning model 404. The machine learning model 404 considers a system dump sequence and an event or sequence of application events as input. The trained machine learning model contains system state class definitions that are further used to classify a target computing system state by analyzing features captured from data inputs. The machine learning model 404, is also capable of clustering the system state into at least three clusters corresponding to an infected system state, a suspicious system state, and a clean system state. Clustering is performed for a training data set to define clusters and determine system state classification.

Figure 8:
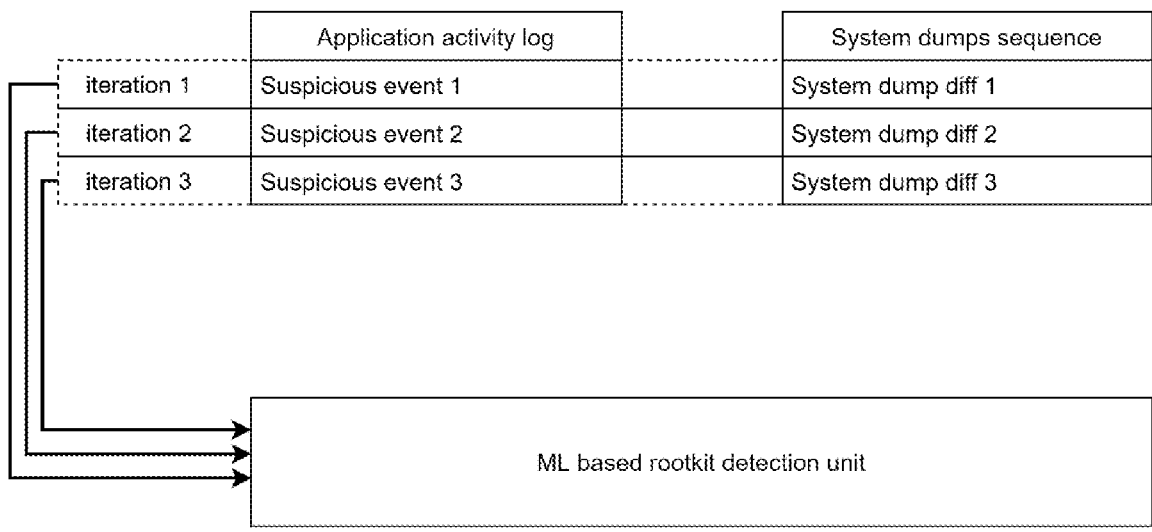
FIG. 8 shows a training iteration pattern of the machine learning model.

FIG. 8 describes a training iteration pattern of the machine learning model 404, in accordance with one embodiment. The application activity log 308 may contain a sequential list of one or more suspicious events. The system dump sequence contains a sequential list of one or more differential memory dumps. In one implementation, differential memory dump 1 may correspond to suspicious event 1, differential memory dump 2 may correspond to suspicious event 2, and so on. Differential memory dump 1 and suspicious event 1 may form iteration 1, Differential memory dump 2 and suspicious event 2 may form iteration 2. In the same implementation, multiple iterations are formed to train a machine learning model 404-based rootkit detection unit. Further such iterations comprising application activity events in couple with system dump or in couple with differential memory dump forms an iteration for rootkit detection on a target computing system. Each iteration comprising system dump sequence and system event sequence can be processed by rootkit detection engine to classify the target computing system. If the classification fails or classify system state as suspicious or unidentified, the next iteration containing new or updated data inputs comprising updated system dump sequence and updated system event sequence is performed. The updated system dump sequence in one embodiment is containing additional differential memory dump corresponding to additional application activity events, which were not processed on previous completed iteration.

The invention claimed is:

1. A security system for identifying a threat during the execution of a malicious function based on system dump sequence analysis comprising:
   a system event monitor for intercepting and collecting one or more application activity events corresponding to a computing system in accordance with predefined security policy instilled within the security system;
   a system dump capture driver configured to:
   capture a first memory dump and a second memory dump in response to the one or more application activity events in accordance with the predefined security policy, wherein the first memory dump corresponds to memory before application activity corresponding to intercepted application activity events, and the second memory dump corresponds to memory after application activity corresponding to intercepted application activity events, and generate a differential memory dump, wherein the differential memory dump is indicative of the difference between the first memory dump and the second memory dump;
   a rootkit detection engine configured to:
   receive the system dump sequence as a first data input, and a system event sequence from the system event monitor as a second data input, wherein the system dump sequence consists of at least two differential memory dumps generated by the system dump capture driver and the system event sequence consist of intercepted application activity events corresponding to differential memory dumps in the system dump sequence,
   classify a system state by executing a machine learning model based on the first data input and the second data input, into at least three classes, wherein the three classes are an infected system state, a suspicious system state and a clean system state.

2. The system of claim 1, wherein the rootkit detection engine is further configured to classify a system state based on updated first data input and updated second data input, wherein the updated first data input comprises additional differential memory dump and the updated second data input comprises additional system event corresponding to additional differential memory dump.

3. The system of claim 2, wherein the rootkit detection engine classifies a system state based on the updated first data input, the updated second data input and the result of classifying a system state based on first data input and second data input.

4. The system of claim 1, wherein application activity event comprises at least one of system drivers file operation, process interconnection, buffer operation, network communication related to running applications, Application Programming Interface calls, system driver requests.

5. The system of claim 1, wherein the system event monitor is configured to monitor the events that are indicators of attack and present in at least one threat behavior definitions or signatures.

6. The system of claim 1, wherein the machine learning model trains on a system dump sequence and system event sequence corresponding to an uninfected system.

7. The system of claim 1, wherein the machine learning model trains on a system dump sequence and system event sequence corresponding to the system infected by known malware.

8. The system of claim 1, wherein the machine learning model is based on an artificial neural network.

9. The system of claim 1, wherein the security system is running in user mode.

10. The system of claim 1, wherein the security system is running in kernel mode.

11. The system of claim 1, wherein the system is implemented on a virtual machine.

12. The system of claim 1, wherein a rootkit detection alert is generated upon rootkit detection.

13. A computer implemented method for threat detection based on system dump sequence analysis, the method comprising the steps of:
   a. collecting application activity events;
   b. capturing a first memory dump and a second memory dump in response to one or more of the application activity events in accordance with a predefined security policy, wherein the first memory dump corresponds to memory before application activity corresponding to intercepted application activity events, and the second memory dump corresponds to memory after application activity corresponding to intercepted application activity events;
   c. generating a differential memory dump, wherein the differential memory dump is indicative of the difference between the first memory dump and the second memory dump;
   d. analyzing the system dump sequence as a first data input, and a system event sequence as a second data input with a machine-learning based rootkit detection unit, wherein the system dump sequence consists of at least two differential memory dumps generated by a system dump capture driver and the system event sequence consist of intercepted application activity events corresponding to differential memory dumps in the system dump sequence;
   e. classifying a system state by executing a machine learning model based on the first data input and the second data input, into at least three classes, wherein the three classes are an infected system state, a suspicious system state and a clean system state.

14. The method of claim 13, further comprising blocking application execution if the system state is classified as infected.

15. The method of claim 13, further comprising capturing full system dump and storing consistent dump sequence in a forensic database if the system state is classified as infected.

16. The method of claim 13, further comprising generating a threat detection alert if the system state is classified as infected.

17. The method of claim 13, further comprising updating the first data input and the second data input with additionally collected application activity events and additionally generated differential system dump if the system state is classified as suspicious.

18. The method of claim 17, further comprising classifying a system state based on updated first data input and updated second data input.

19. The method of claim 13, wherein application activity events comprise at least one of Application Programming Interface calls, system driver requests, inter-process communication requests, file operations, network communications, buffer operations.

* * * * *